(12) United States Patent
Dhillon et al.

(10) Patent No.: US 11,388,659 B2
(45) Date of Patent: Jul. 12, 2022

(54) TIERED RE-ALLOCATION OF WIRELESS CHANNELS

(71) Applicant: Charter Communications Operating, LLC, St. Louis, MO (US)

(72) Inventors: Parmjit Dhillon, Englewood, CO (US); Sami Makinen, Littleton, CO (US); Umamaheswar A. Kakinada, Centennial, CO (US); Curt C. Wong, Bellevue, WA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/871,840

(22) Filed: May 11, 2020

(65) Prior Publication Data
US 2020/0275355 A1  Aug. 27, 2020

Related U.S. Application Data

(62) Division of application No. 16/211,828, filed on Dec. 6, 2018, now Pat. No. 10,708,857.

(51) Int. Cl.
*H04W 48/16* (2009.01)
*H04W 64/00* (2009.01)

(52) U.S. Cl.
CPC ......... *H04W 48/16* (2013.01); *H04W 64/003* (2013.01)

(58) Field of Classification Search
CPC . H04W 72/0453; H04W 88/08; H04W 72/04; H04W 24/02; H04W 72/14; H04W 72/0406; H04W 74/0808; H04W 56/001; H04W 72/044; H04W 88/085; H04W 74/0816; H04W 72/12; H04W 76/11; H04W 80/02; H04W 28/06; H04W 72/10; H04W 52/243; H04W 24/04; H04W 28/26; H04W 36/0072; H04W 72/0433; H04W 24/00; H04W 52/281; H04W 72/1247;
(Continued)

(56) References Cited

U.S. PATENT DOCUMENTS 9,300,489 B1 *  3/2016  Nolle ................... H04L 47/762
10,231,245 B1 *  3/2019  Wang ................... H04W 52/50
(Continued)

*Primary Examiner* — Daniel Lai
(74) *Attorney, Agent, or Firm* — Armis IP Law, LLC

(57) ABSTRACT

A tiered service management resource providing management of wireless channels in a network environment receives notification of wireless bandwidth such as multiple wireless channels allocated by a spectrum access system (a.k.a., SAS). The spectrum access system allocates the wireless channels for use by a wireless base station in the network environment. Prior to re-allocating the wireless bandwidth (such as a selected wireless channel) to customer premises equipment, the tiered service management resource further receives a communication indicating a wireless spectrum scan performed at a location from which customer premises equipment in the network environment is (being) installed to wirelessly communicate with the wireless base station. Based on an identified fixed wireless service tier (or level) assigned to the customer premises equipment and supplemental information such as the wireless spectrum scan, the tiered service management resource allocates a selected wireless channel from SAS-assigned bandwidth for use by the customer premises equipment.

31 Claims, 12 Drawing Sheets

(58) Field of Classification Search
CPC . H04W 72/00; H04W 72/0493; H04W 72/06; H04W 72/1257; H04W 48/16; H04W 64/003; H04W 84/105; H04W 84/16; H04W 16/16; H04W 72/082; H04W 24/10; H04W 16/14
See application file for complete search history.

(56) References Cited

U.S. PATENT DOCUMENTS

| | | | |
|---|---|---|---|
| 10,271,351 B1* | 4/2019 | Wang | H04W 16/14 |
| 2011/0176424 A1 | 7/2011 | Yang et al. | |
| 2012/0094681 A1* | 4/2012 | Freda | H04W 28/16 |
| | | | 455/452.1 |
| 2015/0188592 A1 | 7/2015 | Solondz | |
| 2015/0257007 A1* | 9/2015 | Solondz | H04L 9/3234 |
| | | | 713/154 |
| 2016/0270089 A1* | 9/2016 | Olfat | H04L 5/0062 |
| 2016/0330743 A1* | 11/2016 | Das | H04W 72/0486 |
| 2017/0280399 A1* | 9/2017 | Chrisikos | H04W 52/38 |
| 2018/0014304 A1* | 1/2018 | Khoshnevisan | H04W 72/0453 |
| 2018/0049140 A1 | 2/2018 | Hirsbrunner et al. | |
| 2018/0132111 A1 | 5/2018 | Mueck et al. | |
| 2018/0288621 A1* | 10/2018 | Markwart | H04W 16/14 |
| 2018/0288622 A1* | 10/2018 | Maria | H04L 63/0853 |
| 2019/0007990 A1 | 1/2019 | Kaliaperumal et al. | |
| 2019/0037537 A1 | 1/2019 | Hassan et al. | |
| 2020/0045615 A1 | 2/2020 | Karimli et al. | |
| 2020/0163012 A1* | 5/2020 | Zhu | H04W 12/08 |

* cited by examiner

FIG. 2

SUBSCRIBER INFORMATION
161-1

CPE 122 ......... S.D. 151 ....... TIER #1 ......... 20 MB/S
CPE 123 ......... S.D. 152 ....... TIER #3 ......... 5 MB/S
              S.D. 153 ....... TIER #2 ......... 10 MB/S
CPE 124 ......... S.D. 154 ....... TIER #3 ......... 5 MB/S
...

CHANNEL ALLOCATION INFORMATION
162-1

WAP 122 ......... ID = XXZ2 ......... S.D. 152 ......... CH #11 ......... 5 MB/S
WAP 123 ......... ID = XXZ3 ......... S.D. 153 ......... CH #12 ......... 10 MB/S
WAP 124 ......... ID = XYZ6 ......... S.D. 154 ......... CH #14 ......... 5 MB/S
...

SAS - ALLOCATED CHANNEL INFORMATION
163

WBS 131 ....... CH #1, CH #11, CH #12, CH #14
...

SUBSCRIBER INFORMATION
161-2

CPE 121 ......... S.D. 151 ......... TIER #1 ......... 20 MB/S

CPE 122 ......... S.D. 152 ......... TIER #3 ......... 5 MB/S

CPE 123 ......... S.D. 153 ......... TIER #2 ......... 10 MB/S

CPE 124 ......... S.D. 154 ......... TIER #3 ......... 5 MB/S

• • •

CHANNEL ALLOCATION INFORMATION
162-2

CPE 121 ......... ID = XYZ1 ......... S.D. 151 ......... CH #1 ......... 20 MB/S

CPE 122 ......... ID = XXZ2 ......... S.D. 152 ......... CH #11 ......... 5 MB/S

CPE 123 ......... ID = XXZ3 ......... S.D. 153 ......... CH #12 ......... 10 MB/S

CPE 124 ......... ID = XYZ6 ......... S.D. 154 ......... CH #14 ......... 5 MB/S

TIERED RE-ALLOCATION OF WIRELESS CHANNELS

RELATED APPLICATION

This application is a divisional application of earlier filed U.S. patent application Ser. No. 16/211,828 entitled "TIERED RE-ALLOCATION OF WIRELESS BANDWIDTH,", filed on Dec. 6, 2018, the entire teachings of which are incorporated herein by this reference.

BACKGROUND

Conventional wireless networks typically include one or more wireless base stations to provide mobile communication devices access to a remote network such as the Internet.

One type of base station is a so-called CBSD (Citizen Broadband Radio Service Device). Such a device uses bandwidth (such as one or more wireless channels) allocated from a CBRS (Citizens Band Radio Service) to support communications with one or more mobile communication devices.

Typically, the one or more wireless channels is allocated to the wireless base station via a so-called SAS (Spectrum Access Service). For example, a base station can be configured to communicate and register with a conventional SAS to receive notification of the wireless bandwidth allocated for use.

Subsequent to allocation, the wireless base station then uses the allocated bandwidth to provide one or more communication devices access to a remote network such as the Internet.

BRIEF DESCRIPTION OF EMBODIMENTS

Embodiments herein provide novel ways of providing improved wireless communications to one or more mobile communication devices in a network environment.

First Embodiments

For example, embodiments herein include a tiered service management resource (such as a tiered wireless service allocation server or CTAS) that oversees management of wireless channels in a network environment. Initially, the tiered service management resource receives notification from a wireless base station (such as a CBSD) in a network environment. The notification indicates wireless bandwidth such as one or more wireless channels allocated by a spectrum access system (a.k.a., SAS) for use by the wireless base station in the network environment. In one embodiment, the customer premises equipment is allocated one or more channels in their entirety from among the channels assigned to the base station. As further discussed herein, the tiered service management resource re-allocates the wireless bandwidth associated with the wireless base station to customer premises equipment in communication with the wireless base station. This can include selecting one or more wireless channels assigned to the base station and then providing notification of the selected one or more wireless channels to the customer premises equipment.

In one example embodiment, prior to re-allocating the wireless bandwidth (such as selecting one or more wireless channels), the tiered service management resource further receives a communication indicating a wireless spectrum scan performed at a location from which customer premises equipment (a wireless device) in the network environment is (being) installed to wirelessly communicate with the wireless base station. Based on an identified fixed wireless service level (such as a tier assigned to the customer premises equipment) assigned to the customer premises equipment and/or results of the wireless spectrum scan, the tiered service management resource allocates an appropriate portion of the SAS-assigned bandwidth for use by the customer premises equipment.

In accordance with further embodiments, the tiered service management resource supports multi-tier allocation of wireless channels. For example, as previously discussed, the tiered service management resource receives notification of one or more wireless channels allocated by a spectrum access system to the wireless base station. In one embodiment, the wireless base station receives the notification of the one or more wireless channels allocated by the spectrum access system and forwards it to the tiered service management resource. Alternatively, note that the tiered service management resource can be configured to receive the notification of allocated wireless bandwidth from the spectrum access system.

Subsequent to allocation of the bandwidth (one or more wireless channels) and use by the wireless base station, the tiered service management resource further re-allocates (selects), depending on different assigned tiered service levels of subscribers, the allocated wireless bandwidth (such as one or more wireless channels) to customer premises equipment. In other words, the spectrum access system first allocates the bandwidth (one or more wireless channel); the tiered service management resource re-allocates the bandwidth (one or more wireless channel).

In accordance with further embodiments, during the re-allocation of bandwidth, the tiered service management resource communicates a message specifying the re-allocated portion (such as one or more channels, portions of a channel, etc.) of the SAS allocated bandwidth to the customer premises equipment. The tiered service management resource repeats a process of allocating different portions of wireless bandwidth to each of the different customer premises equipment. Thus, the tiered service management resource provides notification of the assigned portion of wireless bandwidth (such as one or more wireless channels assigned to the wireless base station) to be used by the customer premises equipment to communicate with the wireless base station.

Note that the network environment can include any number of (wireless) customer premises equipment. For example, in one embodiment, the customer premises equipment as previously discussed is first customer premises equipment in the wireless network environment managed by the tiered service management resource. The tiered service management resource is further operable to receive a second communication indicating a second wireless spectrum scan performed at a second location from which second customer premises equipment (wireless device) in the network environment is (being) installed to wirelessly communicate with the wireless base station. In furtherance of providing wireless connectivity in the network environment, the tiered service management resource re-allocates different wireless bandwidth to (selects different wireless channels for use by) the different customer premises equipment depending on a respective service tier to which the customer premises equipment belongs.

In one embodiment, a first portion of wireless bandwidth (such as one or more wireless channels) assigned to the first customer premises equipment supports a first wireless bandwidth between the wireless base station and the first customer premises equipment; a second portion of bandwidth (such as one or more wireless channels) assigned to the second customer premises equipment supports a second wireless bandwidth between the wireless base station and the second customer premises equipment. In this example embodiment, because the second customer premises equipment is assigned a higher tier than the first customer premises equipment, the second wireless bandwidth is greater than the first wireless bandwidth.

Thus, rather than randomly assign use of wireless channels from a spectrum access system, embodiments herein include a tiered service management resource to re-allocate use of the wireless bandwidth allocated to the wireless base station.

Note further that each of the different customer premises equipment can be assigned a different wireless service tier based on bandwidth or other suitable parameter. For example, in one embodiment, the first customer premises equipment is assigned a first tier in a multi-tiered wireless subscription hierarchy; the second customer premises equipment is assigned a second tier in the multi-tiered wireless subscription hierarchy; and so on. As previously discussed, in one embodiment, the second tier affords a higher wireless bandwidth than the first tier.

In accordance with yet further embodiments, the tiered service management resource can be configured to maintain a map indicating a fixed wireless service level assigned to each of the different customer premises equipment (subscribers), the wireless service level indicates a respective wireless service bandwidth (and/or wireless link quality) assigned to the customer premises equipment.

In accordance with further embodiments, the multiple wireless channels assigned by the spectrum access system for use by the wireless base station and/or tiered service management resource includes wireless bandwidth and/or channels available in a CBRS (Citizens Band Radio System) frequency band. Based on the nature of CBRS channels, use of the SAS-allocated channels can be revoked at any time in favor of use of the corresponding bandwidth (such as one or more wireless channels) by a higher priority incumbent user or licensed user.

In yet further embodiments, the tiered service management resource provisionally selects the one or more wireless channels for use by the customer premises equipment. For example, the tiered service management resource can be configured to communicate operational settings assigned for use by the customer premises equipment through the wireless base station to the target customer premises equipment. During confirmation or verification phase, the customer premises equipment uses the (wireless communication) operational settings (such as its location, antenna parameters, etc.) to formulate a request to the spectrum access system to confirm use of the provisionally assigned portion of bandwidth (such as one or more wireless channels) as indicated by the tiered service management resource.

Accordingly, embodiments herein include receiving notification of wireless bandwidth allocated by a spectrum access system. A tiered service management resource then controls re-allocation (selection and assignment) of the different wireless bandwidth to each of multiple fixed customer premises equipment (wireless access points) depending on a tiered subscription levels assigned to respective subscribers and/or other parameters such as location of the customer premises equipment, wireless channel interference at the location, etc.

Second Embodiments

As previously discussed, embodiments herein include different customer premises equipment in a wireless network environment. Each can be assigned a different tiered level of wireless service.

In accordance with further embodiments, during operation, the customer premises equipment receives notification of a wireless channel selected from wireless bandwidth (such as one or more wireless channels) allocated for use by a wireless base station. The tiered service management resource provisionally allocates the wireless channel to the customer premises equipment for its use. In one embodiment, the customer premises equipment receiving the assignment uses the allocated bandwidth (such as an allocated one or more wireless channels) to communicate with the wireless base station and access a remote network such as the Internet.

In furtherance of using the selected bandwidth (one or more wireless channels) as indicated by the tiered service management resource, the customer premises equipment can be configured to obtain information from the tiered service management resource to generate a formal request to the spectrum access system to use the wireless channels. The customer premises equipment communicates the formal request to the spectrum access system to register the use of the one or more wireless channels allocated by the tiered service management resource.

In accordance with further embodiments, the wireless bandwidth is initially allocated by the spectrum access system to the wireless base station; the wireless base station communicates notification of the SAS-allocated bandwidth to the tiered service management resource. The tiered service management resource (such as allocation management hardware) then reallocates one or more selected wireless channel (or portions thereof) to the customer premises equipment to communicate with the wireless base station.

In one embodiment, selection of the bandwidth (such as one or more wireless channels) re-allocated to the customer premises equipment is based on a wireless subscription level assigned to the user. For example, higher tier subscribers are assigned more bandwidth or higher quality wireless communication link than lower tier subscribers.

In yet further embodiments, the wireless network environment includes multiple wireless base stations and customer premises equipment operated at different locations in a respective wireless network. The tiered service management resource manages re-allocation of first bandwidth (such as one or more wireless channels allocated from the spectrum access system) to the first customer premises equipment at a first location in the wireless network environment. The tiered service management resource manages re-allocation of bandwidth (such as one or more wireless channels allocated from the spectrum access system) to the second customer premises equipment at a second location in the wireless network environment.

In one embodiment, in a manner as previously discussed, each of the different customer premises equipment is at least provisionally assigned use of a respective amount of wireless bandwidth or one or more wireless channels. Further, as previously discussed, the customer premises equipment communicates with the spectrum access system (such as through a respective wireless base station) to formally register the customer premises equipment with the spectrum access system to use the provisionally allocated wireless bandwidth (such as one or more wireless channels).

In accordance with still further embodiments, the customer premises equipment obtains (from any suitable resource) information associated with the customer premises equipment such as: i) a location of the customer premises equipment, ii) antenna information, iii) power level information, iv) channel information, etc.

The customer premises equipment utilizes the retrieved information to generate and communicate the above-mentioned request message through a wireless base station to the spectrum access system originally allocating the wireless bandwidth. Via formal registration of the customer premises equipment and use of the wireless bandwidth, the spectrum access system confirms grant and further use of the provisionally allocated wireless bandwidth to the customer premises equipment. Grant can further include notification to the customer premises equipment that the customer premises equipment is able to transmit a particular power level, such as a same or different power level than originally requested by the customer premises equipment.

Third Embodiments

Further embodiments herein include selective re-allocation of wireless channels based on current operating conditions of customer premises equipment.

For example, at a first location (such as at a location where first customer premises is being installed) in the wireless network environment, a wireless scanner resource scans a wireless spectrum to detect interference levels associated with multiple wireless channels. An operator (such as an installer) of the wireless scanner resource communicates the scan information indicating the detected interference levels to the tiered service management resource (such as allocation management hardware). Note that the installer can communicate further information such as an identity of a subscriber to which the customer premises equipment has been assigned, location information indicating where the customer premises equipment is being installed, etc.

In one embodiment, in addition to receiving the scan information obtained at the first location, the tiered service management resource receives notification of wireless bandwidth assigned for use in a vicinity of the first location by a spectrum access system. The tiered service management resource selects (re-allocates) wireless bandwidth from one or more wireless channels allocated for use by the spectrum access system. The tiered service management resource then communicates the re-allocated portion of wireless bandwidth (such as selected one or more wireless channels) to the first customer premises equipment to configure the first customer premises equipment at the first location to use the selected one or more wireless channels.

In accordance with further embodiments, in addition to communicating the scan information to the tiered service management resource, an installer of the customer premises equipment communicates an identity of a corresponding subscriber associated with the first customer premises equipment being installed at the first location. In one embodiment, the tiered service management resource utilizes the identity of the corresponding subscriber to identify a respective wireless service tier assigned to the subscriber. For example, the tiered service management resource maps an identity of the corresponding subscriber domiciled at the first location (or wireless device being installed) to a subscription level assigned to the subscriber.

Based on the subscription level assigned to the subscriber and wireless interference information from the scanner resource, the tiered service management resource selects bandwidth (such as one or more wireless channels) from the SAS-allocated bandwidth (one or more wireless channels) and assigns it for use by the customer premises equipment.

In accordance with yet further embodiments, the customer premises equipment is allocated one or more channels in their entirety (at least for specific durations of time) from among the channels assigned to the base station. In one embodiment, the customer premises equipment may need to share wireless channels with other customer premises equipment. In such an instance, the one or more wireless channels may be scheduled for use by particular customer premises equipment (through the serving eNB or wireless base station) only for a fraction of time to provide the requisite bandwidth services to the customer premises equipment.

The one or more channels are allocated based on various factors such as:
  location of respective customer premises equipment
  profile of a respective subscriber (with the customer premises equipment)
  characteristics of an antenna associated with the customer premises equipment
  bandwidth needs of the customer premises equipment
  operator policies providing the wireless service the customer premises equipment Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately located processor devices) to: receive notification from a wireless base station, the notification indicating multiple wireless channels allocated by a spectrum access system for use by the wireless base station in a network environment; receive a communication indicating a wireless spectrum scan performed at a location from which customer premises equipment is installed to wirelessly communicate with the wireless base station; and allocate, based on a fixed wireless service level assigned to the customer premises equipment and the wireless spectrum scan, one or more of the multiple wireless channels for use by the customer premises equipment.

Another embodiment includes a computer readable storage medium and/or system having instructions stored thereon. The instructions, when executed by computer processor hardware, cause the computer processor hardware (such as one or more co-located or disparately processor devices) to: receive notification of a wireless channel selected from multiple wireless channels allocated to a wireless base station, the wireless channel provisionally reallocated to the customer premises equipment to communicate with the wireless base station; obtain information associated with the customer premises equipment to generate a request; and communicate the request to a spectrum access system to register the use of the selected wireless channel by the customer premises equipment.

Yet another embodiment herein includes a computer readable storage medium and/or system having instructions stored thereon. The instructions, when executed by computer processor hardware, cause the computer processor hardware (such as one or more co-located or disparately processor devices) to: at a first location in a wireless network environment, scan a wireless spectrum to detect interference levels associated with multiple wireless channels; communicate scan information indicating the detected interference levels to allocation management hardware; from the allocation management hardware, receive notification of a wireless channel assigned to first customer premises equipment being installed at the first location, the wireless channel selected from multiple wireless channels allocated for use by a spectrum access system; and configure the first customer premises equipment at the first location with the assigned wireless channel to communicate in the wireless network environment.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited to provide more efficient use of wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating subscriber mapping information and channel allocation information according to embodiments herein.

FIG. 4 is an example diagram illustrating update of channel allocation information after re-assignment from a tiered service management resource according to embodiments herein.

Figure 1:
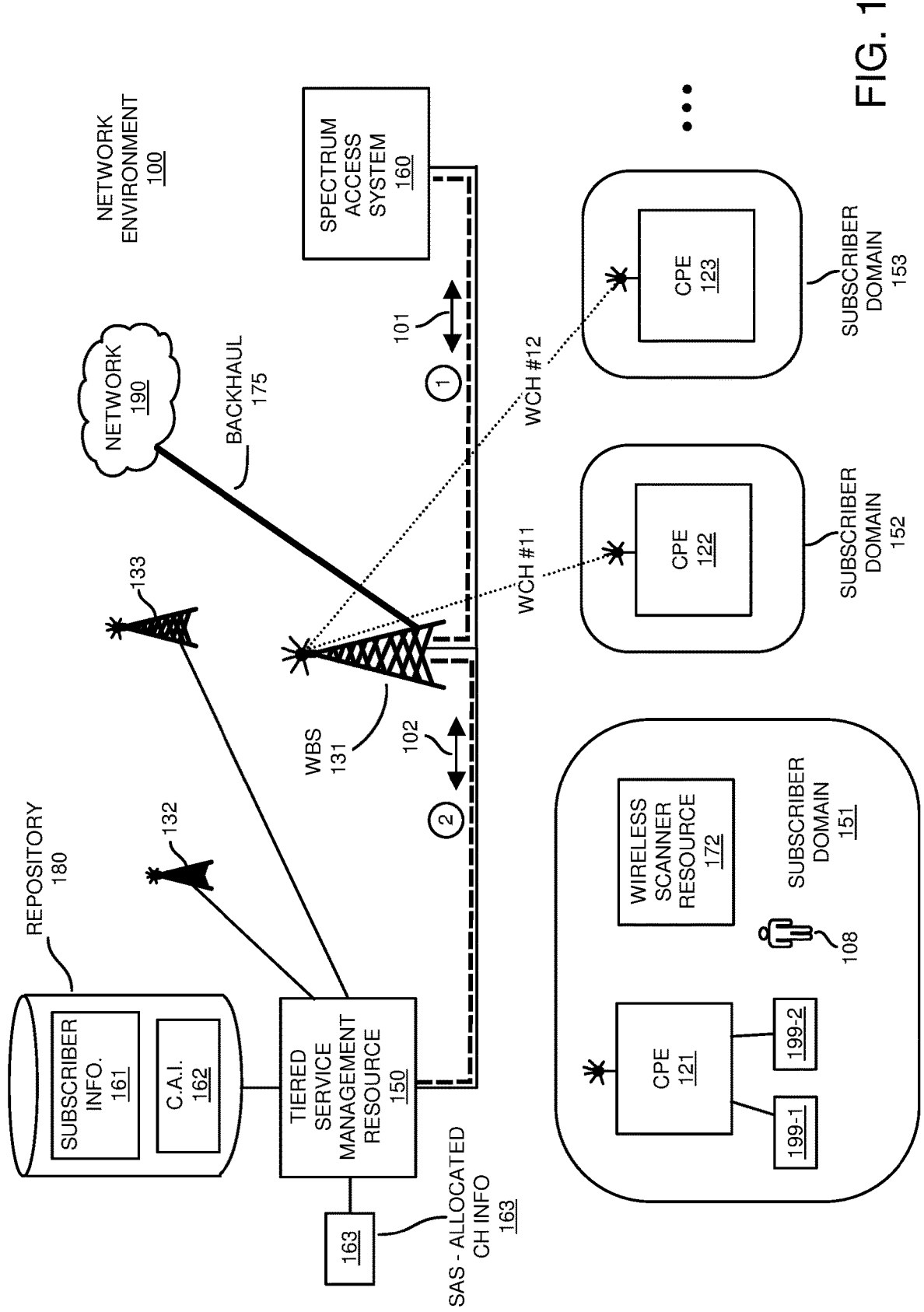
FIG. 1 is an example diagram illustrating a wireless network environment and notification of spectrum access system-allocated wireless bandwidth according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a tiered service management resource in a network environment receives notification of wireless bandwidth such as one or more wireless channels allocated by a spectrum access system (a.k.a., SAS). The spectrum access system allocates the wireless bandwidth (such as one or more wireless channels) for use by a wireless base station (and other wireless base stations) in the network environment. The tiered service management resource controls the allocation of the SAS-allocated wireless bandwidth for fixed wireless access (in respective customer premises or subscriber domains) based on one or more factors such as a subscription tier (bandwidth, quality of service, etc.) assigned to a respective subscriber domain/subscriber, wireless channel interference detected in the respective subscriber domain, location of the respective subscriber domain, etc.

More specifically, FIG. 1 is an example diagram illustrating a wireless network environment and notification of allocated wireless bandwidth according to embodiments herein.

In this example embodiment, the network environment 100 includes subscriber domain 151, subscriber domain 152, subscriber domain 153, etc., wireless base station 131, tiered service management resource 150, spectrum access system 160, repository 180, and network 190.

Subscriber domain 151 includes customer premises equipment 121 (being installed by user 108); subscriber domain 152 includes customer premises equipment 122 (previously installed); subscriber domain 153 includes customer premises equipment 123 (previously installed); and so on.

Note that each of the resources as described herein such as wireless base station 131, spectrum access system 160, tiered service management resource 150, customer premises equipment 121, etc., can be implemented as hardware, software, or a combination of hardware and software.

As further discussed herein, subsequent to being allocated wireless bandwidth (such as use of one or more wireless channels in their entirety), the respective customer premises equipment provides any of one or more communication devices in a respective subscriber domain access to network 190 through a combination respective customer premises equipment, wireless link, wireless base station 131 and backhaul 175.

The following disclosure further describes how the tiered service management resource 150 oversees management and selection and assignment (re-allocation) of wireless channels in the network environment 100.

In one embodiment, the wireless base station 131 initially communicates with the spectrum access system 160 for allocation of bandwidth such as one or more wireless channels that are subsequently used to provide wireless connectivity to the subscriber domains 151, 152, 153, etc.

Assume in this example that, via communications 101, the wireless base station 131 receives notification from the spectrum access system 160 that wireless channel #11, wireless channel #12, wireless channel #14, and wireless channel #1, are allocated for use by the wireless base station 131.

In one embodiment, the multiple wireless channels (1, 11, 12, and 14) assigned by the spectrum access system 160 for use by the wireless base station includes wireless channels available in a CBRS (Citizens Band Radio System) frequency band. The allocated wireless channels can include: one or more Priority Access Lease (PAL) wireless channels, General Authorized Access (GAA) wireless channels, or a combination of both.

Note that the customer premises equipment in network environment communicates in accordance with any suitable wireless protocol. In one embodiment, the customer premises equipment in network environment 100 communicates via the LTE (Long Term Evolution) protocol (5G protocol).

Based on the nature of CBRS channels, note that assignment/use of the SAS-allocated channels can be revoked at any time to enable use of the corresponding bandwidth (such as one or more wireless channels) by a higher priority incumbent user such as the government or licensed user.

Via further communications 102, subsequent to learning of assigned bandwidth via communications 101, the wireless base station 131 notifies tiered service management resource 150 of the allocated wireless channels wireless channel #11, wireless channel #12, wireless channel #14, and wireless channel #1.

Note that, as an alternative to receiving notification of allocated wireless channels from the wireless base station 131, if desired, the tiered service management resource 150 can be configured to receive the notification of allocated wireless bandwidth from the spectrum access system 160 or any other suitable resource.

Tiered service management resource 150 stores the allocated channels as SAS-allocated channel information 163.

As further discussed herein, subsequent to allocation by the spectrum access system 160, the tiered service management resource 150 further assigns (such as via re-allocation) the SAS-allocated bandwidth to different customer premises equipment depending on one or more factors or conditions such as different wireless service tiers assigned to respective subscriber domains, amount of noise for each of the wireless channels in a particular location, etc.

Accordingly, general embodiments herein include a multi-level allocation of wireless bandwidth. In other words, the spectrum access system 160 initially allocates a set of wireless channels such as wireless channel #1, wireless channel #11, wireless channel #12, wireless channel #14, to the wireless base station 131. The tiered service management resource 150 selectively re-allocates use of those channels to the corresponding customer premises equipment disposed in different subscriber domains.

In one embodiment, re-allocation includes the tiered service management resource 150 communicating message information specifying the re-allocated portion (such as one or more channels chosen from wireless channel #1, wireless channel #11, wireless channel #12, wireless channel #14, portions of a channel, etc.) of the SAS-allocated bandwidth to the respective customer premises equipment or installer. In other words, the tiered service management resource 150 provides notification of the different assigned portion of bandwidth to be used by the respective customer premises equipment to communicate with the wireless base station 131.

FIG. 2 is an example diagram illustrating subscriber-to-tier mapping information, channel allocation information, and SAS-allocated channel information according to embodiments herein.

Based on assignment of wireless channels as previously discussed, the SAS-allocated channel information 163 indicates assignment of wireless channels #1, #11, #12, and #14 to wireless base station 131. In other words, the wireless base station 131 (or corresponding general location of the wireless base station 131) is initially assigned use of wireless channel #1, wireless channel #11, wireless channel #12, and wireless channel #14.

Note that a bandwidth amount and which of the wireless channels (or portions) that is assigned for use by the wireless base station 131 can dynamically change over time. In such an instance, to accommodate different tiered customer premises equipment, the tiered service management resource 150 can be configured to change which channels are re-allocated for use by the different customer premises equipment. In other words, if certain wireless bandwidth is no longer available, the tiered service management resource 150 can be configured to re-allocate any remaining wireless channels to the customer premises equipment depending their subscription levels. The tiered service management resource also can revoke of wireless channels allocated to first customer premises equipment and allocate it for use by another if needed.

Further embodiments herein include allocating use of a respective one or more channels for durations of time to each of the customer premises equipment such that the different customer premises equipment shares us each of the same wireless channel but at different times.

As its name suggests, the subscriber information 161-1 indicates attributes of a respective subscriber or subscriber domain.

For example, the subscriber information 161-1 indicates that the subscriber domain 151 has not yet been assigned customer premises equipment. Subscriber information 161-1 further indicates that the subscriber domain 151 is assigned tier #1 (such as highest tier) wireless services (20 megabyte per second wireless uplink/downlink service).

Subscriber information 161-1 further indicates that the customer premises equipment 122 is assigned to a subscriber associated with subscriber domain 152. Subscriber information 161-1 indicates that the subscriber domain 152 is assigned tier #3 (such as lowest tier) wireless services (5 megabyte per second wireless uplink/downlink service).

Subscriber information 161-1 further indicates that the customer premises equipment 123 is assigned to a subscriber in subscriber domain 153. Subscriber information 161-1 indicates that the subscriber domain 153 is assigned tier #2 (middle tier) wireless services (10 megabyte per second wireless downlink service).

The subscriber information 161-1 further indicates that the customer premises equipment 124 is assigned to a subscriber in subscriber domain 154. Subscriber information 161-1 indicates that the subscriber domain 154 is assigned tier #3 (lowest tier) wireless services (5 megabyte per second wireless uplink/downlink service).

Accordingly, the tiered wireless service management resource 150 maintains a map (such as subscriber information 161-1) indicating a fixed wireless service level assigned to each of the different customer premises equipment, subscribers, and/or subscriber domains in network environment 100.

As previously discussed, the wireless service level (such as tier #1, tier #2, tier #3) indicates a respective wireless service or bandwidth (and/or wireless link quality) currently assigned to the different customer premises equipment. Tier #1 supports highest bandwidth such as 20 MB/s; tier #2 supports medium bandwidth such as 10 MB/s; tier #3 supports lowest bandwidth such as 5 MB/s;

As further shown in FIG. 2, the channel allocation information 162-1 indicates the different wireless channels (such as channels 11, 12, and 14) assigned (such as already re-allocated) by the tiered service management resource 150 to different customer premises equipment.

For example, the channel allocation information 162-1 indicates that customer premises equipment 122 is assigned an ID of XXZ2) and is installed and operated in subscriber domain 152, which is currently assigned use of wireless channel #11. Use of wireless channel #11 provides a 5 megabyte per second (MB/s) wireless data rate service between the customer premises equipment 122 and the wireless base station 131.

The channel allocation information 162-1 further indicates that customer premises equipment 123 is assigned ID of XXZ3 and is installed and operated in subscriber domain 153, which is currently assigned use of wireless channel #12. Use of the wireless channel #12 provides a 10 megabyte per second wireless data rate service between the customer premises equipment 123 and the wireless base station 131.

The channel allocation information 162-1 further indicates that customer premises equipment 124 assigned ID of XYZ6 is installed and operated in subscriber domain 154, which is currently assigned use of wireless channel #14. Use of wireless channel #14 provides a 5 megabyte per second wireless data rate service between the customer premises equipment 124 and the wireless base station 131.

Figure 3:
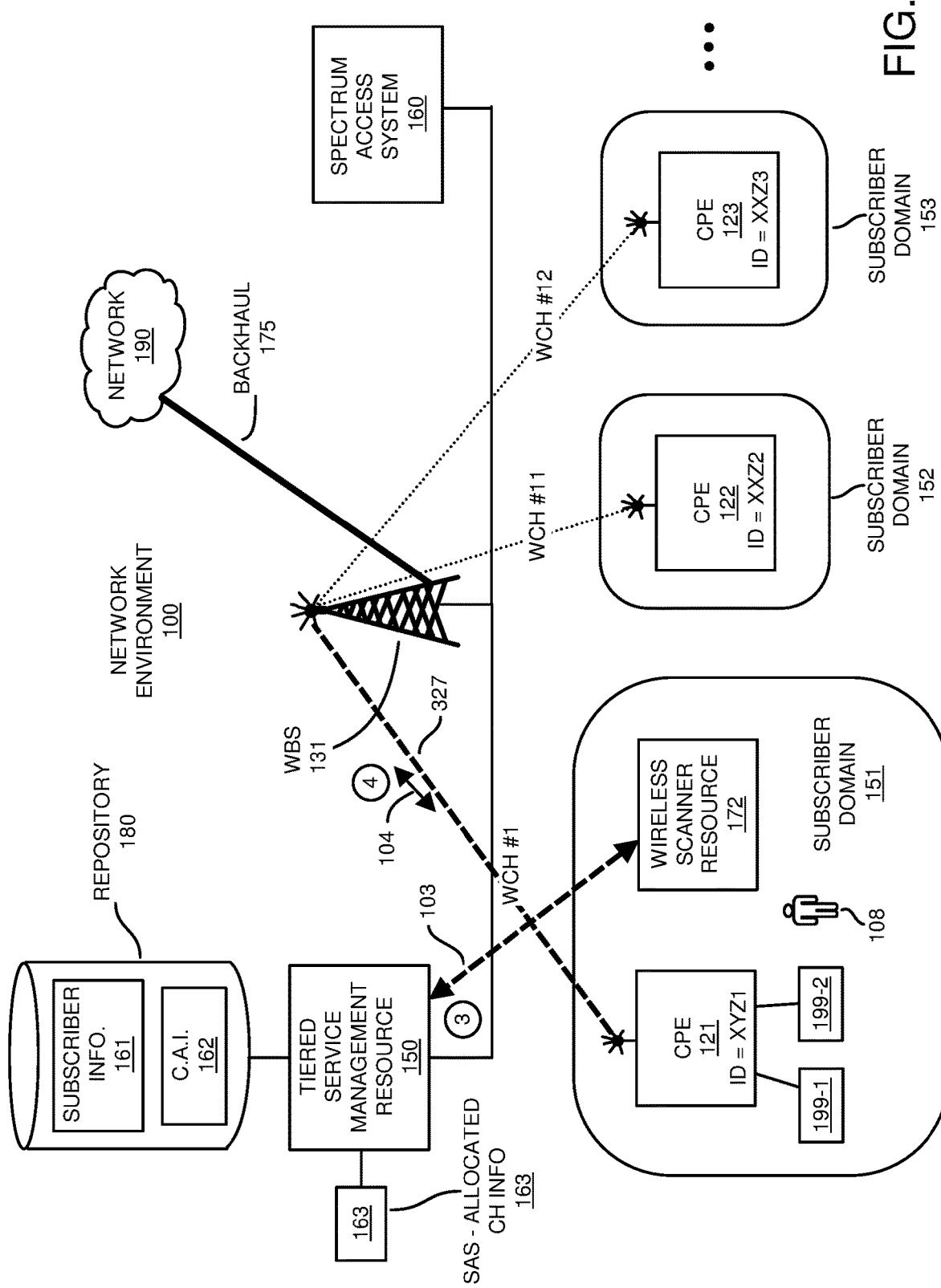
FIG. 3 is an example diagram illustrating communication of scan information and establishment of a wireless communication link according to embodiments herein.

FIG. 3 is an example diagram illustrating communication of scan information and establishment of a wireless communication link according to embodiments herein.

In one example embodiment, prior to re-allocating the wireless bandwidth (such as one or more wireless channels as specified by SAS-allocated channel information 163) to the subscriber domain 151, the installer 108 of customer premises equipment 121 performs a wireless scan test in the subscriber domain 151 to determine which of the wireless channels in the available spectrum (such as wireless channel #1, 11, 12, and 14, or alternatively all wireless channels) experience wireless interference. The scan test ensures that allocation of a respective one or more wireless channels to the customer premises equipment 121 would make sense. For example, allocating a corresponding wireless channel in which the customer premises equipment 121 experiences a high amount of interference probably would result in poor use of the corresponding wireless channel. Conversely, allocating a corresponding wireless channel in which the customer premises equipment 121 experiences a low amount of interference probably would result in good use of the corresponding wireless channel.

In one embodiment, subsequent to scanning for wireless interference amongst the wireless channels, the installer 108 operating the wireless scanner resource 172 communicates the respective scan information indicating the detected interference level of different communication channels in subscriber domain 151 to the tiered service management resource (such as allocation management hardware).

Note that the subscriber domain 151 and devices 199-1, 199-2, etc., may not yet have access to any networks until the customer premises equipment 121 is installed.

Further in this example embodiment, the tiered service management resource 150 receives, via communications 103, results of the wireless spectrum scan performed at the subscriber domain 151 in which the customer premises equipment 151 in the network environment is (being) installed to provide wirelessly connectivity of the subscriber domain and communication devices 199 therein to the wireless base station 131. The scan information can be communicated in any suitable manner such as via the wireless scan resource 172 and/or a wireless communication device operated by the installer 108.

In one embodiment, in addition to communicating scan information to the tiered service management resource 150, the installer 108 communicates an identity (ID value such as XYZ1) assigned to the customer premises equipment 121 over a respective communication link to the tiered service management resource 150. The installer 108 also communicates an identity and/or attributes of the subscriber domain 151 (such as location of the subscriber domain 151) to the tiered service management resource 150.

The tiered service management resource 150 uses the subscriber information 161 to map the subscriber domain 151 to a corresponding tier assigned to the subscriber domain 151. In this example embodiment, the tiered service management resource 150 determines that the subscriber domain 151 is assigned tier #1, in which sufficient wireless bandwidth must be allocated to the customer premises equipment 121 to support a 20 megabytes per second wireless data rate.

Based on the identified fixed wireless service level (tier #1 and 20 MB/s data rate) assigned to the customer premises equipment 121 and the wireless spectrum scan information indicating that wireless interference on wireless channel #1 is low in the subscriber domain 151, the tiered service management resource 150 re-allocates a portion of the bandwidth (such as wireless channel #1) for use by the customer premises equipment 121.

If wireless channel #1 has not yet been allocated to the wireless base station 131 or tiered service management resource 150, the wireless base station 131 or tiered service management resource 150 can be configured to communicate with the spectrum access system 160 for additional bandwidth.

Further in this example embodiment, the tiered service management resource 150 communicates the provisionally allocated wireless channel #1 to user-installer 108, who configures the customer premises equipment 121 to (at least temporarily) communicate using wireless channel #1.

Based on the new allocation of wireless channel #1, the tiered service management resource 150 updates the channel allocation information 162-2 as shown in FIG. 4.

Referring again to FIG. 3, via communications 104, the customer premises equipment 121 establishes a respective wireless communication link 327 with the wireless base station 131 using the newly allocated wireless channel #1, such as programmed by the user 108 (installer).

Figure 5:
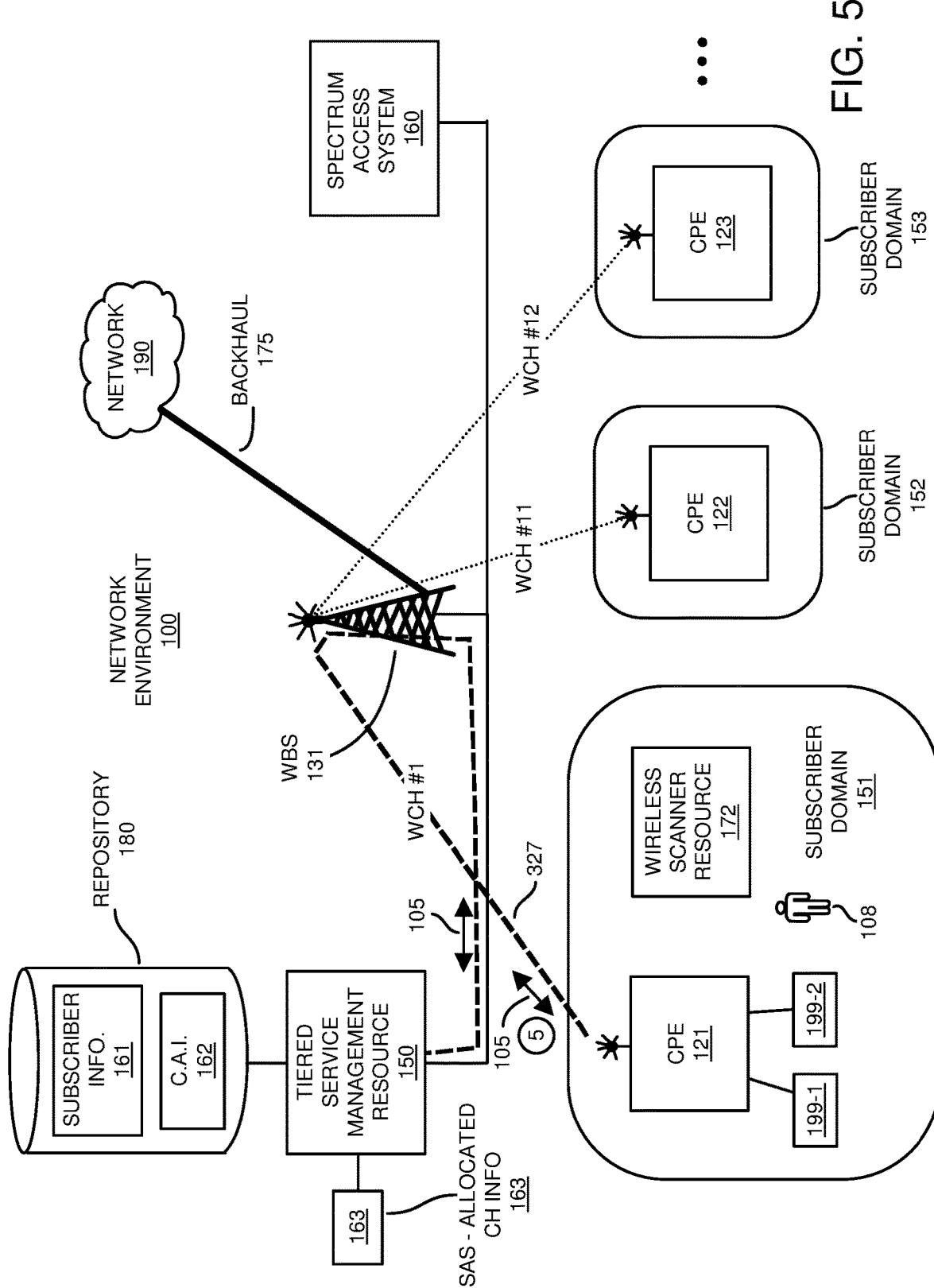
FIG. 5 is an example diagram illustrating communications to and from a tiered service management resource according to embodiments herein.

FIG. 5 is an example diagram illustrating communications to a tier management resource according to embodiments herein.

In furtherance of using the bandwidth (such as wireless channel #1) provisionally assigned by the tiered service management resource 150, the customer premises equipment 121 registers with the spectrum access system 160 to confirm use of this bandwidth (wireless channel #1).

In one embodiment, in furtherance of registering, via communications 105, the customer premises equipment obtains 121 information from the tiered service management resource 150 to generate a formal request to use the wireless channel #1.

Via communications 105, the tiered service management resource 150 communicates operational settings assigned for use by the customer premises equipment 121 through the wireless base station 131 to the customer premises equipment 121. The customer premises equipment 121 uses the (wireless communication) operational settings to formulate a request to the spectrum access system 160 to confirm or register use of the provisionally assigned portion of bandwidth (such as wireless channel #1) as indicated by the tiered service management resource 150.

More specifically, in accordance with further embodiments, the customer premises equipment 121 provisionally allocated channel #1 communicates with the tiered service management resource 150 or any other suitable resource to retrieve information associated with the customer premises equipment such as: i) a location of the customer premises equipment, ii) antenna information, iii) power level information, iv) channel information, etc.

As further discussed below in FIG. 6, the customer premises equipment 121 utilizes any or all of this retrieved information to generate and communicate a formal registration request message through the wireless base station 131 to the spectrum access system 160.

In one embodiment, the customer premises equipment is required to generate the formal request to use the wireless channel #1 at its current location (subscriber domain 151). Registration with the spectrum access system 160 ensures that the customer premises equipment 121 does not interfere with other devices in the network environment 100.

Figure 6:
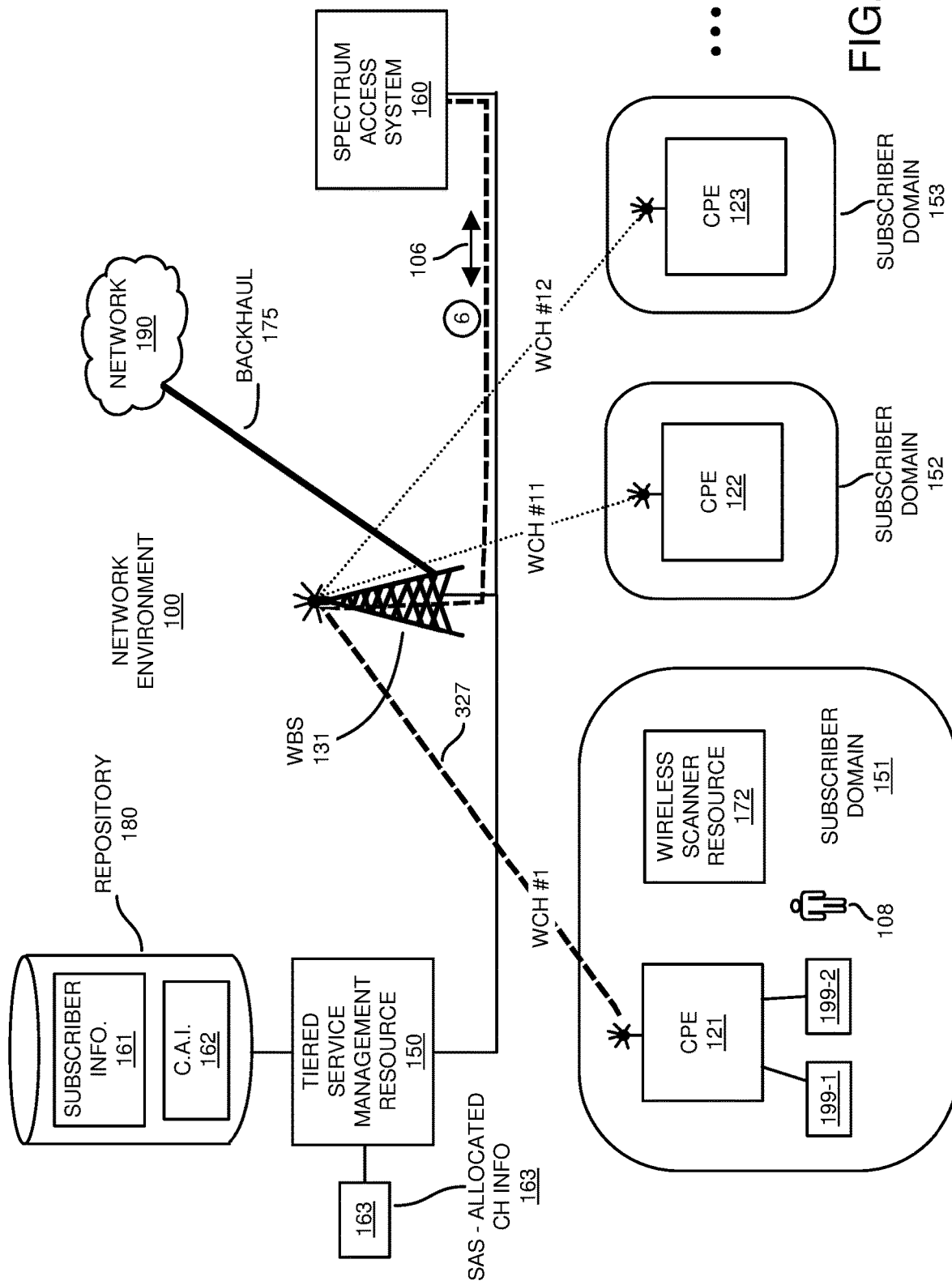
FIG. 6 is an example diagram illustrating registration of customer premises equipment with a spectrum access system according to embodiments herein.

FIG. 6 is an example diagram illustrating registration of customer premises equipment with a spectrum access system according to embodiments herein.

In one embodiment, if the customer premises equipment 121 transmits at a wireless power transmit below a threshold value such as 200 mWatts, there is no need for the customer premises equipment 121 to register with the spectrum access system 160 to use the allocated wireless channels. However, if the customer premises equipment 121 wishes to wirelessly transmit at a power level greater than threshold value, the customer premises equipment 121 may be required to register itself with the spectrum access system 160.

Thus, the provisional allocation of the wireless channel #1 may only allow communications at a lower power transmit level lower than what is needed for the customer premises equipment 121 to support a sufficient wireless communication data rate back to the wireless base station 131 on a respective uplink.

Assuming that the customer premises equipment 121 needs to transmit at a higher power level than merely a standard mobile communication device in communication with the wireless base station 131, in a manner as previously discussed, the customer premises equipment 121 registers with the spectrum access system 160 to use the provisionally allocated wireless channel #1 at a higher power level.

In one embodiment, registration to use the wireless channel #1 includes communicating (via communications 106) a respective request from the customer premises equipment 121 over the wireless communication link 327 through the wireless base station to the spectrum access system 160. The customer premises equipment 121 requests use of the wireless channel #1 allocated by the tiered service management resource 150. Based on information retrieved from one or more resources, the request includes any suitable information such as: i) a location of the customer premises equipment, ii) attributes of antenna associated with the customer premises equipment 121, iii) power transmit level information (such as wireless power level at which the customer premises equipment 121 would like to transmit), iv) allocated channel information such as identity of wireless channel #1, etc.

After the spectrum access system 160 determines that use of the wireless channel #1 is acceptable at the subscriber domain 151, via a message to the customer premises equipment 121, the spectrum access system 160 grants use of the wireless channel #1 via a notification to the customer premises equipment 121.

Subsequent to registration, the customer premises equipment 121 provides one or more devices 199-1 and 199-2 in the subscriber domain 151 access to and retrieval of content from the network 190 via communications (such as via wireless channel #1) between the customer premises equipment 121 and the wireless base station 131 over the wireless communication link 327.

Figure 7:
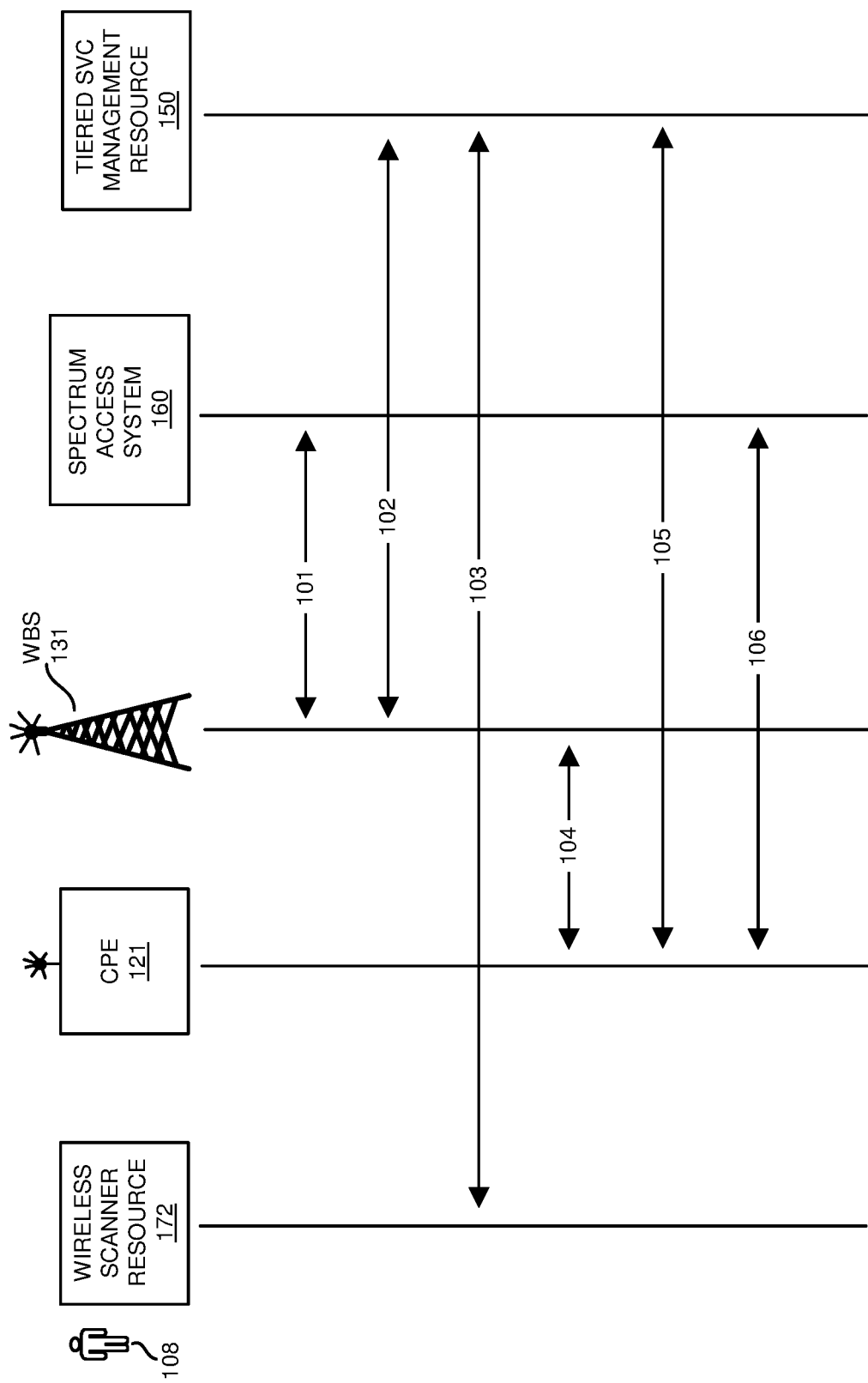
FIG. 7 is an example diagram illustrating a summary of data flows amongst different resources in wireless network environment according to embodiments herein.

FIG. 7 is an example diagram illustrating a summary of data flows amongst different resources in wireless network environment according to embodiments herein.

Via communications 101, the wireless base station (such as a CBSD, eNodeB) receives allocation of wireless channels from the spectrum access system 160.

As previously discussed, the spectrum access system 160 can be configured to allocate wireless channels from a CBRS wireless spectrum (such as one or more 10 MHz wireless channels between 3.550 and 3.700 GHz). The SAS-allocated channels can include one or more PAL (Priority Access License) channels, one or more GAA (General Authorized Access) channels, or a combination of these different types of wireless channel.

In one embodiment, the customer premises equipment 121 initially has no wireless service or wired service to the backhaul 175 (FIG. 1). Via communications 102, the wireless base station 131 communicates the allocated channel information (such as allocated wireless channel #1, wireless channel #11, wireless channel #12, wireless channel #14) to the tiered wireless service management resource 150. As previously discussed, the tiered service management resource 150 produces and stores the SAS-allocated channel information 163 to keep track of allocated channels.

Via communications 103, the installer 108 installing the customer premises equipment 121 in the subscriber domain 151 communicates wireless spectrum scan information to the tiered wireless management resource 150. The wireless spectrum scan information indicates the level of interference associated with the different channels in the CBRS spectrum. Accordingly, the tiered wireless management resource 150 is notified of which wireless channels would be best suited for implementation in the customer premises equipment 121. In addition to communicating the spectrum scan information to the tiered wireless management resource 150, the user 108 communicates customer information and/or an identity (such as XYZ1) of a respective customer premises equipment 121 being installed in the subscriber domain 151. In one embodiment, the installer 108 communicates with the tiered service management resource 150 to notify the tiered service management resource 150 of a tier level assigned to the subscriber domain 151. Alternatively, the tiered service management resource 150 learns of the tier assigned to the customer premises equipment 121 via stored subscriber information.

In a reverse direction, via communications 103, the tiered service management resource 150 notifies the installer and/or customer premises equipment 121 of a respective one or more wireless channels assigned for use by the customer premises equipment 121. In this example embodiment assume that the customer premises equipment 121 has been assigned wireless channel #1. The user 108 programs the customer premises equipment 121 to use wireless channel #1.

Via communications 104, the customer premises equipment 121 establishes a respective wireless communication link 327 with the wireless base station 131 over allocated wireless channel #1.

Via communications 105 over the wireless communication link 327 to the tiered service management resource 150, the customer premises equipment 121 retrieves information from the tiered service management resource 150 such as setting information, location information, antenna information, wireless power transmit setting information, channel assignment information, etc., associated with the customer premises equipment 121. In one embodiment, the customer premises equipment 121 uses the received setting information to formulate a request transmitted to the spectrum access system 160.

Via further communications 106, the customer premises equipment 121 communicates the generated request to register the customer premises equipment 121 with the spectrum access system 160 and use the provisionally allocated wireless channel #1 based on the settings provided by the tiered service management resource 150. In a reverse direction, the spectrum access system 160 notifies the customer premises equipment 121 that it is allocated to use the wireless channel #1 via the specified settings. As previously discussed, the notification can indicate a power level at which the customer premises equipment 121 is able to wirelessly communicate using wireless channel #1.

Figure 8:
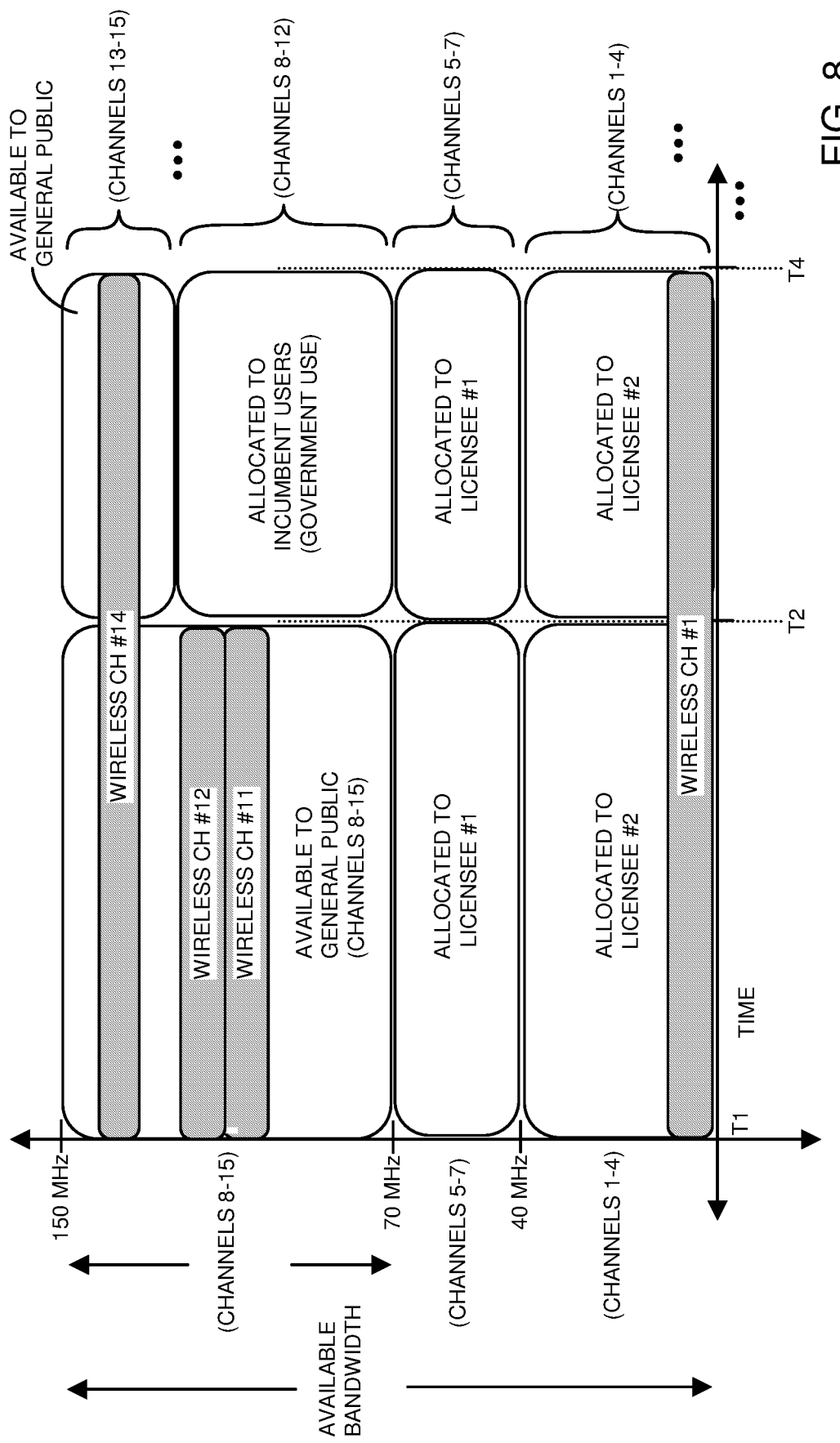
FIG. 8 is an example diagram illustrating channel usage at different times according to embodiments herein.

FIG. 8 is an example diagram illustrating channel usage at different times according to embodiments herein.

As previously discussed, the spectrum access system 160 allocates wireless channels #1 (such as a PAL channel), #11 (such as a GAA channel), #12 (such as a GAA channel), and #14 (such as a GAA channel). In this example embodiment, these wireless channels are available to the wireless base station 131 between time T1 and time T2. The channels are allocated in a manner as previously discussed to different customer premises equipment.

Assume that at around time T2, the incumbent user takes over use of wireless channels #8 through #12. This means that customer premises equipment 122 and customer premises equipment 123 are no longer able to use wireless channel #11 and wireless channel #12 between time T2 and time T4. Accordingly, lower tiered subscribers assigned lower quality wireless channels #11 and #12 (such as GAA wireless channels) are no longer provided wireless access via wireless base station 131 using wireless channel #11 and #12 in this time range. Since wireless channel #14 is still available, the tiered service management resource 150 can be configured to provide shared use of this channel amongst the lower tier customer premises equipment 122, 123, etc.

However, note that the wireless channel #1 (such as a PAL wireless channel) re-allocated to the customer premises equipment 131 provides continued connectivity with the wireless base station 131 since use of the licensed wireless channel #1 has not been terminated.

Accordingly, in one embodiment, the tiered service management resource 150 can be configured to allocate more desirable PAL or licensed wireless channels to higher tiered subscriber domains (such as a those assigned tier #1). The tiered service management resource 150 can be configured to assign lower tiered subscriber domains such as those assigned tier #3 are assigned use of GAA wireless channels.

Figure 9:
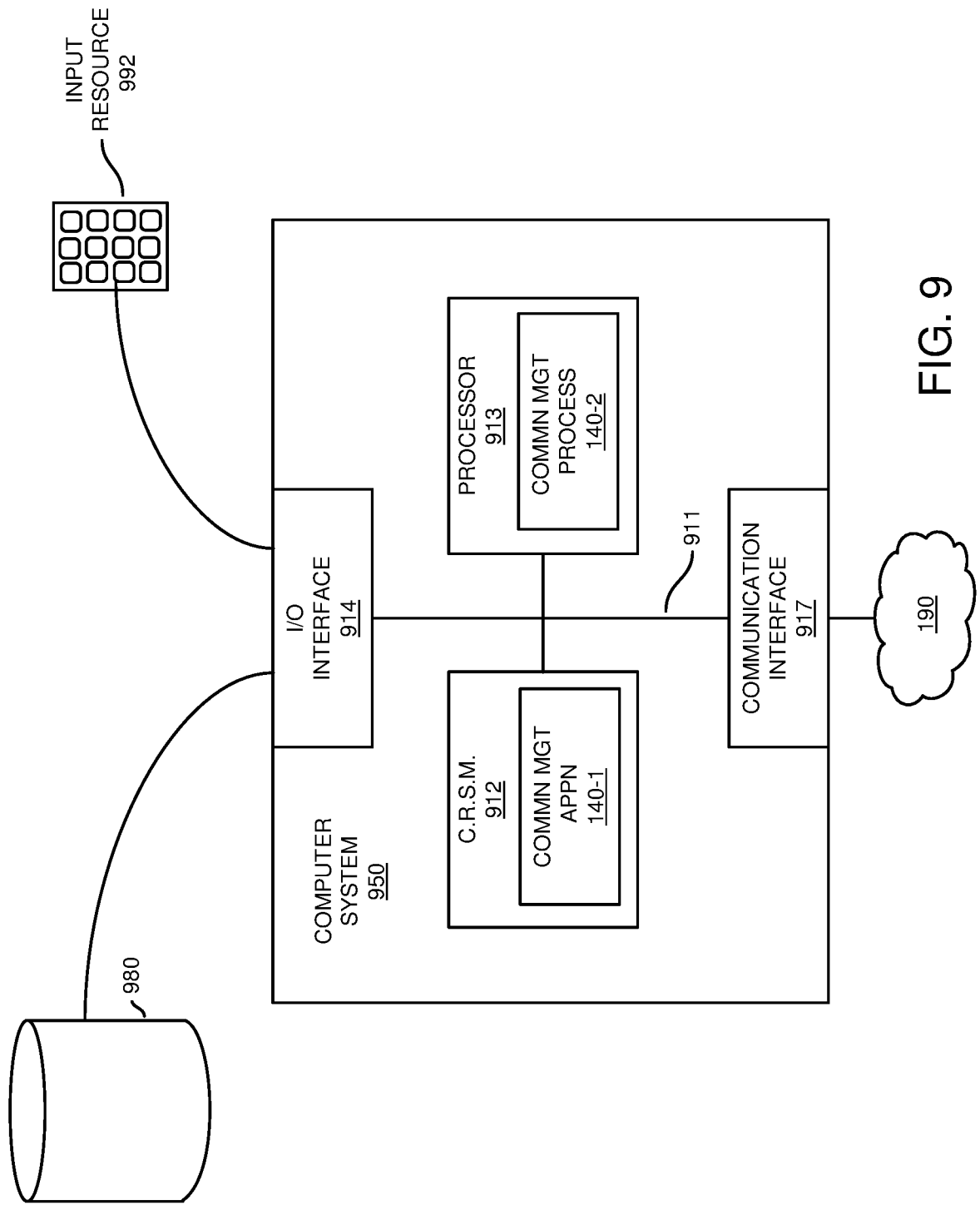
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as wireless base station 131, spectrum access system 160, tiered service management resource 150, customer premises equipment 121, etc.) as discussed herein can be configured to include computer processor hardware and/or corresponding executable instructions to carry out the different operations as discussed herein.

As shown, computer system 950 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in communication management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 10-12. Note that the steps in the flowcharts below can be executed in any suitable order.

Figure 10:
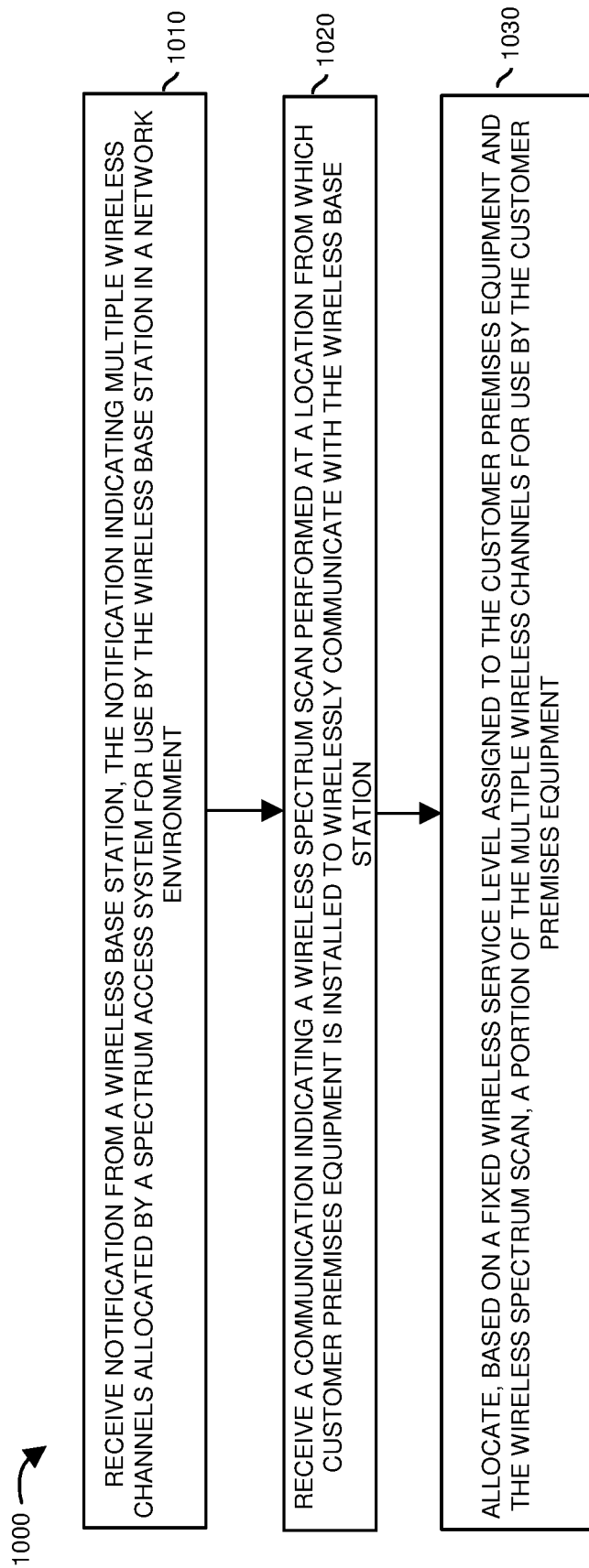
FIGS. 10-12 are example diagrams illustrating methods according to embodiments herein.

FIG. 10 is a flowchart 1000 illustrating an example method according to embodiments. Note that there will be some overlap with respect to concepts as discussed above.

In processing operation 1010, the tiered service management resource 150 receives notification (such as via communications 102) from a wireless base station 131. The notification indicates multiple wireless channels (such as channels #1, #11, #12, and #14) allocated by the spectrum access system 160 for use by the wireless base station 131 in the network environment 100.

In processing operation 1020, the tiered service management resource 150 receives a communication (such as via communications 103) indicating a wireless spectrum scan at a location (such as subscriber domain 151) from which customer premises equipment 151 is installed to wirelessly communicate with the wireless base station 131.

In processing operation 1030, the tiered service management resource 150 allocates, based on a fixed wireless service level (such as tier #1) assigned to the customer premises equipment 121 and the wireless spectrum scan from wireless scan resource 172, a portion of the multiple wireless channels (such as wireless channel #1) for use by the customer premises equipment 121.

Figure 11:
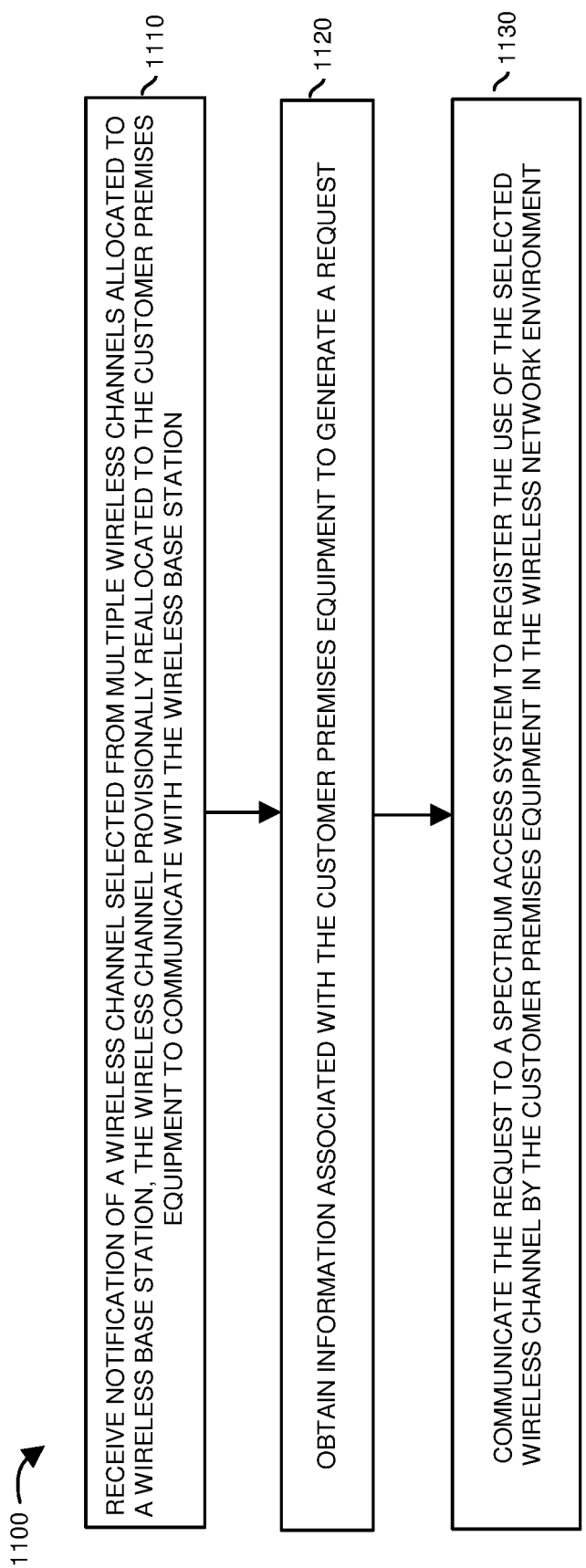

FIG. 11 is a flowchart 1100 illustrating an example method according to embodiments. Note that there will be some overlap with respect to concepts as discussed above.

In processing operation 1110, the customer premises equipment 121 receives notification of a wireless channel (such as wireless channel #1) selected from multiple wireless channels allocated to wireless base station 131 by tiered service management resource 150. In one embodiment, the wireless channel (such as wireless channel #1) is provisionally assigned by the tiered service management resource 150 to the customer premises equipment 121 to communicate with the wireless base station 131.

In processing operation 1120, the customer premises equipment 121 provisionally allocated wireless channel #1 obtains information associated with the customer premises equipment 121 to generate a request to use the wireless channel #1.

In processing operation 1130, the customer premises equipment 121 communicates the request (such as via communications 106) to a spectrum access system to register the use of the selected wireless channel #1 by the customer premises equipment 121 in the wireless network environment 100.

Figure 12:
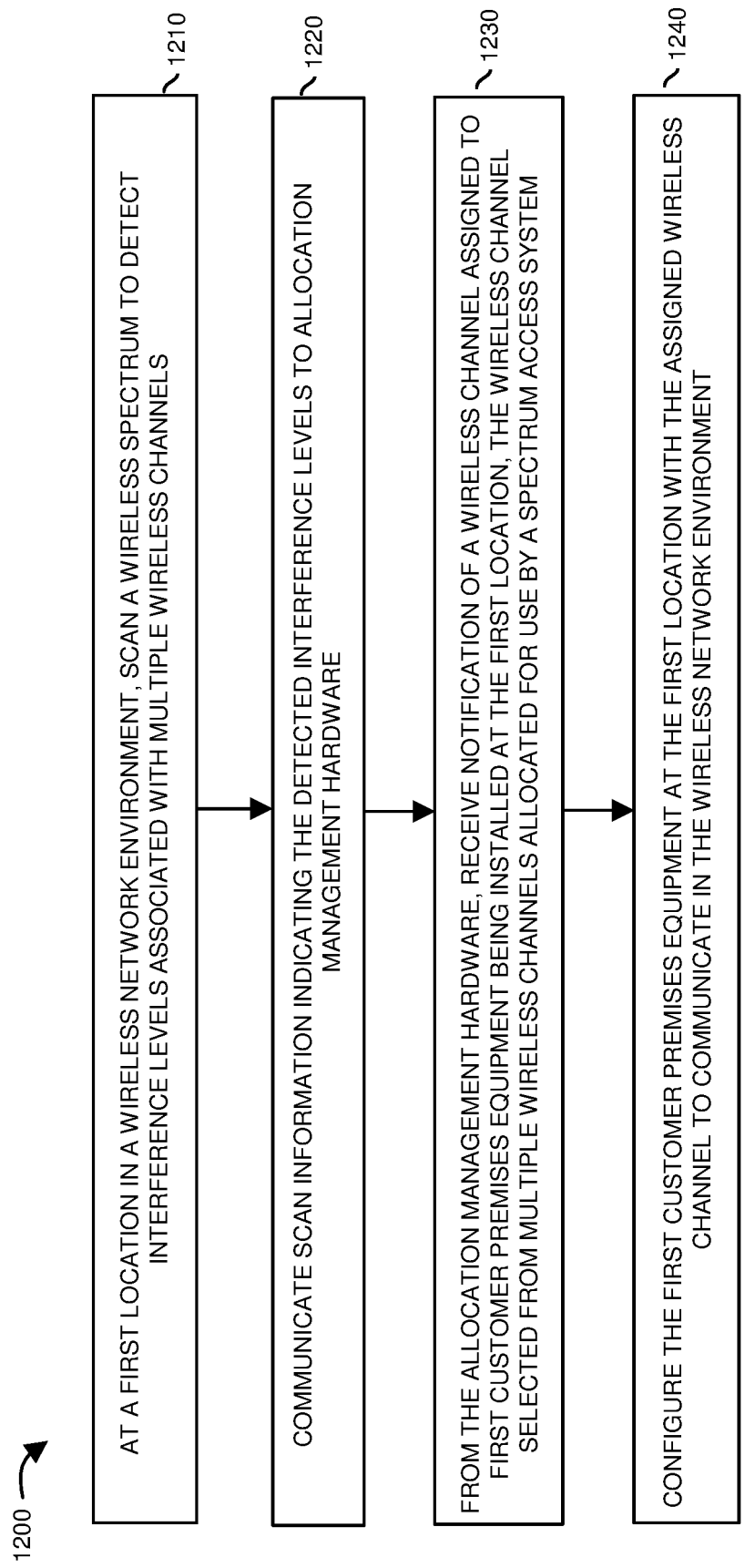

FIG. 12 is a flowchart 1200 illustrating an example method according to embodiments. Note that there will be some overlap with respect to concepts as discussed above.

In processing operation 1210, at a first location in a wireless network environment, a wireless scan resource 172 (such as operated by user 108) scans a wireless spectrum to detect interference levels associated with multiple wireless channels.

In processing operation 1220, a communication device communicates scan information indicating the detected interference levels to tiered service management resource 150.

In processing operation 1230, the user 108 receives notification of wireless channel #1 assigned to customer premises equipment 121 being installed at the first location (subscriber domain 151). In one embodiment, the wireless channel #1 is selected from multiple wireless channels (such as wireless channels #1, #11, #12, and #14) allocated for use by a spectrum access system 160.

In processing operation 1240, the user 108 configures the customer premises equipment 121 at the first location (such as subscriber domain) with the assigned wireless channel #1 to communicate in the wireless network environment 100.

Note again that techniques herein are well suited to facilitate dynamic re-allocation of wireless channels to different customer premises equipment to provide different tiers of wireless service. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   at customer premises equipment in a wireless network environment:
      receiving notification of a wireless channel provisionally reallocated from allocation management hardware to the customer premises equipment to communicate with a wireless base station, the allocation management hardware allocated the wireless channel from a spectrum access system, the allocation management hardware disparately located with respect to the spectrum access system;
      in response to receiving the notification, generating a request to use the wireless channel; and
      communicating the request to the spectrum access system to register the use of the wireless channel by the customer premises equipment in the wireless network environment.

2. The method as in claim 1, wherein the wireless channel is one of multiple wireless channels assigned by the allocation management hardware to the wireless base station.

3. The method as in claim 2, wherein the multiple wireless channels are allocated by the spectrum access system to the wireless base station, the wireless base station communicating identities of the allocated multiple wireless channels to the allocation management hardware.

4. The method as in claim 3, wherein the allocation management hardware reallocates the selected wireless channel to the customer premises equipment to communicate with the wireless base station, the selected wireless channel allocated to the customer premises equipment based on a wireless subscription level assigned to the user.

5. The method as in claim 4, wherein the customer premises equipment is first customer premises equipment; and
   wherein the wireless base station is a first wireless base station managed by the allocation management hardware, the allocation management hardware managing allocation of the multiple wireless channels to the first customer premises equipment at a first location in the wireless network environment and second customer premises equipment at a second location in the wireless network environment based on different wireless subscription levels assigned to the first customer premises equipment and the second customer premises equipment.

6. The method as in claim 1, wherein communicating the request to the spectrum access system includes: communicating the request in a message from the customer premises equipment through the wireless base station to the spectrum access system, the message registering the customer premises equipment to use the selected wireless channel.

7. The method as in claim 1, wherein the customer premises equipment communicates the request message over the selected wireless channel to the wireless base station, the wireless base station further communicating the request message to the spectrum access system.

8. The method as in claim 1 further comprising:
   generating the request based on obtained information associated with the customer premises equipment, the obtained information including:
   i) a location of the customer premises equipment; and
   ii) bandwidth requirements of the customer premises equipment.

9. The method as in claim 1, wherein the selected wireless channel is reallocated by the allocation management hardware to the customer premises equipment based on a detected amount of wireless interference detected in a vicinity of the customer premises equipment.

10. The method as in claim 1 further comprising:
    communicating with the allocation management hardware to retrieve information to generate the request.

11. The method as in claim 1, wherein the allocation management hardware reallocates use of the wireless channel to the customer premises equipment, the spectrum access system allocating the wireless channel to the allocation management hardware.

12. The method as in claim 1 further comprising:
    receiving the notification from the wireless base station.

13. The method as in claim 1 further comprising:
    receiving settings at the customer premises equipment, the settings assigned for use by the customer premises equipment to communicate with the wireless base station; and
    via the customer premises equipment, and use of the settings, registering use of the wireless channel with the spectrum access system.

14. The method as in claim 13, wherein registering use of the wireless channel with the spectrum access system includes:
    communicating the request to use the wireless channel through the wireless base station to the spectrum access system.

15. The method as in claim 1, wherein the wireless channel is selected for use by the customer premises equipment in response to detecting, via wireless spectrum scan information, that the wireless channel provides sufficient bandwidth for providing a wireless service level assigned to the customer premises equipment.

16. The method as in claim 15, wherein the wireless spectrum scan information indicates a detected wireless interference level for the wireless channel at a location where the customer premises equipment is being installed.

17. The method as in claim 1 further comprising:
receiving wireless spectrum scan information indicating a detected wireless interference level for the wireless channel at a location where the customer premises equipment is being installed.

18. The method as in claim 17 further comprising:
via the wireless spectrum scan information, selecting use of the wireless channel to communicate with the wireless base station in response to detecting that the wireless channel supports wireless bandwidth required by the customer premises equipment.

19. The method as in claim 1, wherein the wireless channel is selected based on a wireless interference level associated with the wireless channel as detected at a location where the customer premises equipment is being installed.

20. The method as in claim 1, wherein the customer premises equipment is being installed in a subscriber domain, the method further comprising:
via the customer premises equipment, providing multiple communication devices in the subscriber domain access to a remote network via communications through the customer premises equipment and the wireless base station.

21. The method as in claim 1 further comprising:
via the allocation management hardware, selecting the wireless channel based on a service tier assigned to the customer premises equipment, the selected wireless channel providing a bandwidth level of service as specified by the service tier assigned to the customer premises equipment.

22. The method as in claim 21, wherein the wireless channel is a first wireless channel;
wherein the allocation management hardware is allocated a second wireless channel from the spectrum access system, the method further comprising:
receiving scan information indicating: i) a first wireless bandwidth supported by the first wireless channel at a location where the customer premises equipment resides, and ii) a second wireless bandwidth supported by a second wireless channel at the location where the customer premises equipment resides; and
wherein the first wireless channel is selected for use by the customer premises equipment in response to detecting that the first wireless bandwidth associated with the first wireless channel has sufficient available bandwidth for providing the bandwidth level of service for the service tier assigned to the customer premises equipment.

23. A system comprising:
customer premises equipment operative to:
receive notification of a wireless channel provisionally reallocated from allocation management hardware to the customer premises equipment to communicate with a wireless base station, the allocation management hardware allocated the wireless channel from a spectrum access system, the allocation management hardware disparately located with respect to the spectrum access system;
in response to receiving the notification, generate a request to use the wireless channel; and
communicate the request to the spectrum access system to register use of the wireless channel by the customer premises equipment in the wireless network environment.

24. The system as in claim 23, wherein the wireless channel is one of multiple wireless channels assigned to the wireless base station.

25. The system as in claim 24, wherein the multiple wireless channels are allocated by the spectrum access system to the wireless base station, the wireless base station communicating identities of the allocated multiple wireless channels to the allocation management hardware.

26. A method comprising:
at a first location in a wireless network environment, scanning a wireless spectrum to detect interference levels associated with multiple wireless channels;
communicating scan information indicating the detected interference levels to allocation management hardware;
from the allocation management hardware, receiving notification of a wireless channel assigned to first customer premises equipment being installed at the first location, the wireless channel selected from multiple wireless channels allocated for use by a spectrum access system, the allocation management hardware disparately located with respect to the spectrum access system; and
configuring the first customer premises equipment at the first location with the assigned wireless channel to communicate in the wireless network environment.

27. The method as in claim 26 further comprising:
communicating an identity of a subscriber associated with the first customer premises equipment being installed at the first location.

28. The method as in claim 26, wherein the allocation management hardware selects the wireless channel based on the identity and the detected interference levels.

29. The method as in claim 26, wherein the spectrum access system assigns the multiple wireless channels to a wireless base station; and
wherein the first customer premises equipment communicates with the wireless base station via the selected wireless channel.

30. The method as in claim 26, wherein the allocation management hardware maps an identity of a subscriber domiciled at the first location to a subscription level assigned to the subscriber; and
based on the assigned subscription level, allocating the selected wireless channel to the first customer premises equipment, the selected wireless channel providing the first customer premises equipment a corresponding bandwidth as indicated by the assigned subscription level.

31. Computer-readable storage hardware having instructions stored thereon, the instructions, when carried out by computer processor hardware, cause the computer processor hardware to:
receive notification of a wireless channel provisionally reallocated from allocation management hardware to the customer premises equipment to communicate with a wireless base station, the allocation management hardware allocated the wireless channel from a spectrum access system, the allocation management hardware disparately located with respect to the spectrum access system;
in response to receiving the notification, generate a request to use the wireless channel; and communicate the request to the spectrum access system to register use of the wireless channel by the customer premises equipment in the wireless network environment.

* * * * *